United States Patent
Nogami et al.

(10) Patent No.: US 12,407,026 B2
(45) Date of Patent: Sep. 2, 2025

(54) METHOD FOR PRODUCING ALL-SOLID-STATE BATTERY

(71) Applicants: MITSUBISHI GAS CHEMICAL COMPANY, INC., Tokyo (JP); NATIONAL INSTITUTE OF ADVANCED INDUSTRIAL SCIENCE AND TECHNOLOGY, Tokyo (JP)

(72) Inventors: Genki Nogami, Niigata (JP); Keita Noguchi, Niigata (JP); Aki Katori, Niigata (JP); Naoto Yamashita, Osaka (JP); Takashi Mukai, Osaka (JP); Masahiro Yanagida, Osaka (JP)

(73) Assignees: MITSUBISHI GAS CHEMICAL COMPANY, INC., Tokyo (JP); NATIONAL INSTITUTE OF ADVANCED INDUSTRIAL SCIENCE AND TECHNOLOGY, Tokyo (JP)

(*) Notice: Subject to any disclaimer, the term of this patent is extended or adjusted under 35 U.S.C. 154(b) by 343 days.

(21) Appl. No.: 17/437,556

(22) PCT Filed: Mar. 4, 2020

(86) PCT No.: PCT/JP2020/009205
§ 371 (c)(1),
(2) Date: Sep. 9, 2021

(87) PCT Pub. No.: WO2020/184340
PCT Pub. Date: Sep. 17, 2020

(65) Prior Publication Data
US 2022/0158249 A1  May 19, 2022

(30) Foreign Application Priority Data
Mar. 12, 2019 (JP) .................. 2019-044522

(51) Int. Cl.
*H01M 10/0585* (2010.01)
*H01M 10/0562* (2010.01)
(Continued)

(52) U.S. Cl.
CPC ... *H01M 10/0585* (2013.01); *H01M 10/0562* (2013.01); *B05D 1/26* (2013.01);
(Continued)

(58) Field of Classification Search
CPC ......... H01M 10/0585; H01M 10/0562; H01M 2300/0071; H01M 4/0404; B05D 1/26; B05D 3/0254
(Continued)

(56) References Cited

U.S. PATENT DOCUMENTS 6,001,509 A * 12/1999 Kim .................... H01M 10/052
429/129
6,045,947 A   4/2000 Shindo et al.
(Continued)

FOREIGN PATENT DOCUMENTS

CN  107317009 A  11/2017
CN  107464951 A  12/2017
(Continued)

OTHER PUBLICATIONS

International Search Report issued in International Patent Application No. PCT/JP2020/009205, dated Jun. 9, 2020, along with English Translation thereof.
(Continued)

*Primary Examiner* — Brian K Talbot
(74) *Attorney, Agent, or Firm* — GREENBLUM & BERNSTEIN P.L.C.

(57) ABSTRACT

The present invention is able to provide a method for producing an all-solid-state battery that has a solid electrolyte layer between a positive electrode layer and a negative
(Continued)

electrode layer. This method for producing an all-solid-state battery is characterized by comprising: a step wherein a coating liquid is applied to at least one of the positive electrode layer and the negative electrode layer, said coating liquid containing a solid electrolyte solution, which is obtained by dissolving a solid electrolyte in a solvent, and fine particles which are insoluble in the solid electrolyte solution; and a step wherein the solvent is removed from the applied coating liquid, thereby having the solid electrolyte deposit on at least one of the positive electrode layer and the negative electrode layer.

6 Claims, 3 Drawing Sheets (51) Int. Cl.
B05D 1/26 (2006.01)
B05D 3/02 (2006.01)
H01M 4/04 (2006.01)

(52) U.S. Cl.
CPC ......... *B05D 3/0254* (2013.01); *H01M 4/0404* (2013.01); *H01M 2300/0071* (2013.01)

(58) Field of Classification Search
USPC .............................................. 427/115, 126.4
See application file for complete search history.

(56) References Cited

U.S. PATENT DOCUMENTS

| | | | | |
|---|---|---|---|---|
| 6,645,675 | B1* | 11/2003 | Munshi | H01M 4/0404 |
| | | | | 429/234 |
| 2005/0026041 | A1* | 2/2005 | Jouanneau | H01M 10/0565 |
| | | | | 429/231.95 |
| 2014/0227606 | A1 | 8/2014 | Suzuki | |
| 2015/0047767 | A1 | 2/2015 | Sano | |
| 2017/0275734 | A1* | 9/2017 | Modica | C03C 1/024 |
| 2018/0375151 | A1* | 12/2018 | Gaben | H01M 4/0457 |
| 2019/0081352 | A1* | 3/2019 | Sasaki | H01M 10/0562 |
| 2020/0083562 | A1* | 3/2020 | Kim | H01M 4/382 |
| 2020/0303778 | A1 | 9/2020 | Nogami et al. | |
| 2020/0343580 | A1* | 10/2020 | Yushin | H01M 10/0565 |
| 2020/0350628 | A1* | 11/2020 | Isojima | H01M 4/131 |
| 2021/0408590 | A1* | 12/2021 | Kuwata | H01M 10/058 |

FOREIGN PATENT DOCUMENTS

| | | |
|---|---|---|
| CN | 108232318 A | 6/2018 |
| CN | 108448169 A | 8/2018 |
| CN | 108832174 A | 11/2018 |
| JP | 11-283664 A | 10/1999 |
| JP | 2010-113819 A | 5/2010 |
| JP | 2011-86556 A | 4/2011 |
| JP | 5194709 B2 | 5/2013 |
| JP | 2015-2080 A | 1/2015 |
| JP | 2016-18679 A | 2/2016 |
| JP | 2016-81905 A | 5/2016 |
| JP | 2017-27656 A | 2/2017 |
| JP | 2018-039689 A | 3/2018 |
| JP | 2018-116784 A | 7/2018 |
| KR | 10-0400413 B1 | 3/2004 |
| WO | 2013/046443 A1 | 4/2013 |
| WO | 2019/078130 A1 | 4/2019 |

OTHER PUBLICATIONS

Written Opinion of the International Searching Authority issued in International Patent Application No. PCT/JP2020/009205, dated Jun. 9, 2020, along with English Translation thereof.
Extended European Search Report issued in corresponding European Patent Application No. 20769860.6 dated Apr. 4, 2022.
Office Action issued in KR Patent Application No. 10-2021-7031630, Dec. 10, 2024, translation.
Office Action issued in CA Patent Application No. 3,132,801, issued Dec. 17, 2024.
Office Action issued Apr. 13, 2023 in corresponding family member Indian Patent application No. 202117045673.
Office Action issued Mar. 30, 2023 in corresponding family member Russian patent application No. 2021123589 and English language translation thereof.

* cited by examiner

METHOD FOR PRODUCING ALL-SOLID-STATE BATTERY

TECHNICAL FIELD

The present invention relates to a method for producing an all-solid-state battery.

BACKGROUND ART

Recently, a demand for lithium ion secondary batteries has been increased in applications including portable information terminals, portable electronic equipments, electric vehicles, hybrid electric vehicles and stationary power storage systems. However, currently, a flammable organic solvent is used as an electrolytic solution in lithium ion secondary batteries, and a strong exterior is required so that an organic solvent does not leak out. Further, for example, in the case of portable personal computers, it is necessary to employ a structure against a risk at the time when an electrolytic solution leaks out. Thus, there is a limitation on structures of devices.

Moreover, the range of applications thereof has been widened to movable bodies such as vehicles and aircrafts, and a high capacity is desired for stationary lithium ion secondary batteries. Under such circumstances, importance tends to be placed on safety more than before, and efforts are concentrated on the development of an all-solid-state lithium ion secondary battery in which none of toxic substances such as organic solvents is used.

For example, use of an oxide, phosphate compound, organic polymer, sulfide, complex hydride or the like as a solid electrolyte in an all-solid-state lithium ion secondary battery has been examined.

All-solid-state batteries are broadly classified into the thin film type and the bulk type. In the case of the thin film type, interface bonding is ideally formed by utilizing gas phase film formation, but the electrode layer is thin (several μm), the electrode area is small, the amount of energy which can be stored per cell is small, and the cost is high. Therefore, it is inappropriate as a battery for large electrical storage devices or electric vehicles, wherein a large amount of energy must be stored. Meanwhile, in the case of the bulk type, the thickness of the electrode layer can be adjusted to be several tens μm to 100 μm, and it is possible to prepare an all-solid-state battery having a high energy density.

Among solid electrolytes, a sulfide solid electrolyte and a complex hydride have characteristics that they have high ion conductivity and are relatively soft, and that therefore it is easy to form the interface between solids. They are stable with respect to metal lithium and have been developed as practical solid electrolytes.

However, in methods for producing all-solid-state batteries using these solid electrolytes, all-solid-state batteries are prepared by techniques using pressing that requires a high pressure, and for this reason, the production of large electrodes is limited, and there is a problem of difficulty in interface bonding. Methods for producing an all-solid-state battery have been developed by using various techniques. Among them, a technique of using a solution of a solid electrolyte is considered as a promising technique for interface bonding, and the development thereof has been promoted (Patent Document 1).

Since it is possible to impregnate fine pores with a solution, a satisfactory electrode layer filled with a solid electrolyte for all-solid-state batteries can be formed by impregnating an electrode layer for lithium ion batteries permeable to an electrolyte with a solid electrolyte solution, followed by removing a solvent to cause the solid electrolyte to deposit. In addition, a method for producing an all-solid-state battery, which does not require high press forming and has very high productivity, can be performed by applying the solid electrolyte solution to the electrode layer filled with the solid electrolyte and drying it to form a solid electrolyte layer and by bonding two electrode sheets obtained. However, when the solid electrolyte layer is formed on the surface of the electrode layer using the solid electrolyte solution, there are problems that the coated surface becomes uneven, resulting in reduction in a yield, and that the all-solid-state battery does not operate normally because an internal short circuit is caused by pinholes generated due to unevenness.

PRIOR ART DOCUMENTS

Patent Documents

Patent Document 1: Japanese Laid-Open Patent Publication No. 2015-2080

SUMMARY OF THE INVENTION

Problems to be Solved by the Invention

Under such circumstances, it is desired to provide a method for producing an all-solid-state battery, wherein unevenness of a solid electrolyte layer is suppressed and excellent productivity is provided.

Means for Solving the Problems

The present inventors diligently made researches in consideration of the above-described problems and obtained an unexpected finding that an all-solid-state battery, in which unevenness of a solid electrolyte layer is suppressed, can be prepared by dispersing insoluble fine particles in a solid electrolyte solution.

Specifically, the present invention is as described below.

<1> A method for producing an all-solid-state battery having a solid electrolyte layer between a positive electrode layer and a negative electrode layer, the method comprising:
  a step of coating at least one of the positive electrode layer and the negative electrode layer with a coating solution, said coating solution containing a solid electrolyte solution, which is obtained by dissolving a solid electrolyte in a solvent, and fine particles which are insoluble in the solid electrolyte solution; and
  a step of removing the solvent from the coated coating solution to deposit the solid electrolyte on at least one of the positive electrode layer and the negative electrode layer.

<2> The method according to item <1>, wherein the fine particles contain at least one selected from the group consisting of silica ($SiO_2$), alumina ($Al_2O_3$), titania ($TiO_2$), zirconia ($ZrO_2$), magnesia (MgO) and calcia (CaO).

<3> The method according to item <1> or <2>, wherein the coating solution contains the fine particles in an amount of 0.1 to 30% by mass.

<4> The method according to any one of items <1> to <3>, wherein the fine particles have an average particle diameter (median diameter d50) of 10 nm to 1 μm.

<5> The method according to any one of items <1> to <4>, wherein the solid electrolyte comprises at least one selected from the group consisting of $LiBH_4$, an $LiBH_4$—$LiI$-based material, $3LiBH_4$—$LiI$, an $LiBH_4$—$P_2S_5$-based material, $9LiBH_4$—$P_2S_5$, an $LiBH_4$—$P_2I_4$-based material, $9LiBH_4$—$P_2I_4$, $85LiBH_4$-$15P_2I_4$, $Li_2B_{12}H_{12}$, $Li_2B_{10}H_{10}$, $LiCB_{11}H_{12}$ and $LiCB_9H_{10}$.

<6> The method according to any one of items <1> to <5>, wherein the solvent comprises at least one selected from the group consisting of $H_2O$, an alcohol-based solvent, an ether-based solvent and a nitrile-based solvent.

<7> The method according to any one of items <1> to <6>, wherein a series of operations of the step of coating and the step of depositing is repeated a plurality of times.

Advantageous Effect of the Invention

According to the present invention, it is possible to provide a method for producing an all-solid-state battery, wherein unevenness of a solid electrolyte layer is suppressed. Further, according to the present invention, since a high pressing pressure is not required, it is possible to provide a method for producing an all-solid-state battery, which has high productivity and can be applied to mass production.

EMBODIMENTS FOR CARRYING OUT THE INVENTION

Hereinafter, the method for producing the all-solid-state battery of the present invention will be specifically described. Note that materials, constitutions, etc. described below do not limit the present invention and can be modified variously within the range of the gist of the present invention. In this specification, when a numerical range is shown using "-", the range includes numerical values at the both sides of "-".

<Electrode Sheet>

Figure 1:
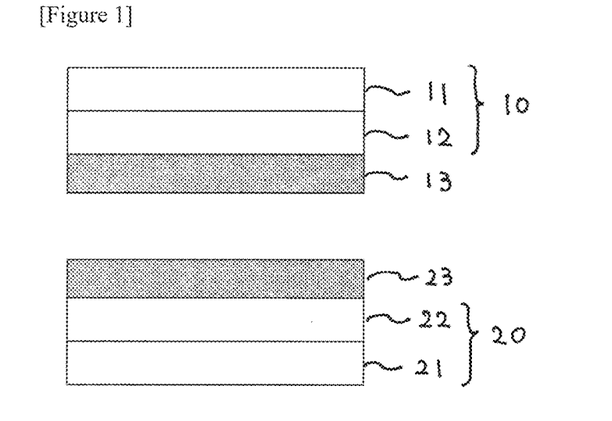
FIG. 1 is a schematic view showing an example of the layer structure of the all-solid-state battery of the present invention.

An example of the layer structure of the all-solid-state battery of the present invention will be described using FIG. 1.

An electrode sheet 10 to be used in the present invention is also referred to as a "positive electrode sheet" and has a positive electrode layer 12 on a current collector 11. On the positive electrode layer 12, a solid electrolyte layer 13 is formed.

An electrode sheet 20 to be used in the present invention is also referred to as a "negative electrode sheet" and has a negative electrode layer 22 on a current collector 21. On the negative electrode layer 22, a solid electrolyte layer 23 is formed.

Further, the positive electrode layer 12 is bonded to the negative electrode layer 22 in a manner such that the solid electrolyte layers 13 and 23 are positioned between the positive electrode layer 12 and the negative electrode layer 22, thereby preparing an all-solid-state battery according to one embodiment of the present invention.

Note that the positive electrode layer and the negative electrode layer are collectively referred to as the electrode layer.

As the electrode layer to be used in the present invention, it is possible to use an electrode layer for lithium-ion batteries using an electrolyte. As described above, in the structure of a general electrode sheet, an electrode layer is formed on a current collector. The positive electrode layer is usually formed with a positive electrode active material, a binder and a conduction assisting agent, and the negative electrode layer is usually formed with a negative electrode active material, a binder and a conduction assisting agent. These electrode layers have a void and can be impregnated with an electrolyte. Note that it is possible to employ a constitution in which a metal foil or alloy foil is used for either the positive electrode layer or the negative electrode layer and the electrode sheet produced in the present invention is used for the other electrode.

As the current collector, in general, a stainless steel foil or aluminum foil is used for the positive electrode layer, and a stainless steel foil or copper foil is used for the negative electrode layer. Note that a current collector whose surface is carbon-coated can also be used.

The positive electrode active material to be contained in the positive electrode layer is not particularly limited as long as it is a material which can release lithium ions at the time of charging and can absorb lithium ions at the time of discharging. Examples thereof include a metal oxide having a transition metal, a sulfur-based positive electrode active material, an organic positive electrode active material, and $FeF_3$ and $VF_3$ utilizing a conversion reaction. In the present invention, the electric potential of the positive electrode active material with reference to lithium is preferably 3.0 V or less because in this case, a reaction between an active material and a boron hydride compound-based solid electrolyte interface is suppressed, resulting in smaller interface resistance. The electric potential of the positive electrode active material with reference to lithium is more preferably 1.0-2.7 V.

As the metal oxide having a transition metal, it is possible to use particles or a thin film of a metal oxide containing lithium and at least one of Mn, Co, Ni, Fe, Cr and V that are transition metals. Specific examples thereof include, but are not particularly limited to, $LiCoO_2$, $LiCo_2O_4$, $LiMnO_2$, $LiMn_2O_4$, $LiMnCoO_4$, $Li_2MnCoO_4$, $LiNi_{0.8}Co_{0.15}Al_{0.05}O_2$, $LiNi_{0.5}Mn_{0.5}O_2$, $Li_2NiMn_3O_8$, $LiVO_2$, $LiV_3O_3$, $LiCrO_2$, $LiFePO_4$, $LiCoPO_4$, $LiMnPO_4$, $LiVOPO_4$, $LiNiO_2$, $LiNi_2O_4$, $LiNi_{1/3}Co_{1/3}Mn_{1/3}O_2$, $Li_2FeSiO_4$, $Li_2MnSiO_4$ and $LiFeBO_3$. Further, $Fe_2O_3$, $Cr_3O_8$, $V_2O_5$, $MnO_2$, etc. can also be used. Among them, $LiCoO_2$, $LiMnO_2$, $LiMn_2O_4$, $LiNi_{0.8}Co_{0.15}Al_{0.05}O_2$, $LiNi_{0.5}Mn_{0.5}O_2$, $Li_2NiMn_3O_8$, $LiFePO_4$, $LiCoPO_4$, $LiMnPO_4$, $LiVOPO_4$, $LiNiO_2$ and $LiNi_{1/3}Co_{1/3}Mn_{1/3}O_2$ are preferred.

Regarding these positive electrode active materials, it is possible to provide a coating layer to the particles or thin film of the positive electrode active materials for the purpose of suppressing a reaction with a solid electrolyte. Examples of the coating layer include $LiNbO_3$, $Li_4Ti_5O_{12}$, $LiTaO_3$, $LiNbO_3$, $LiAlO_2$, $Li_2ZrO_3$, $Li_2WO_4$, $Li_2TiO_3$, $Li_2B_4O_7$, $Li_3PO_4$, $Li_2MoO_4$ and $LiBO_2$.

Specific examples of the sulfur-based positive electrode active material include, but are not particularly limited to, S, a sulfur-carbon composite, $TiS_2$, $TiS_3$, $TiS_4$, NiS, $NiS_2$, CuS, $FeS_2$, $Li_2S$, $MoS_3$, a sulfur-modified polyacrylonitrile, rubeanic acid (dithiooxamide) and a disulfide compound. Among them, $TiS_2$, $TiS_3$, $TiS_4$, NiS, $NiS_2$, $FeS_2$, $Li_2S$, $MoS_3$, a sulfur-modified polyacrylonitrile, a sulfur-carbon composite and rubeanic acid (dithiooxamide) are preferred.

Specific examples of the organic positive electrode active material include, but are not particularly limited to, a radical compound typified by 2,2,6,6-tetramethylpiperidinoxyl-4-ylmethacrylate and polytetramethylpiperidinoxy vinyl ether, a quinone compound, a radialene compound, tetracyanoquinodimethane and phenazine oxide. Among them, a radical compound and a quinone compound are preferred because these compounds have a large theoretical capacity and can maintain a discharge capacity at a relatively good level.

As the above-described positive electrode active material, an optimum material may be selected depending on the type of the solid electrolyte for impregnation. For example, when using $LiBH_4$ having low oxidation resistance as the main component of the solid electrolyte, it is preferred to use a sulfur-based positive electrode active material which is an active material having a low equilibrium potential. As the sulfur-based positive electrode active material, for example, a sulfur-modified polyacrylonitrile typified by the compound described in WO2010/044437 and a sulfur-carbon composite typified by those described in WO2015/030053, Japanese Laid-Open Patent Publication No. 2015-92449 and WO2015/030053 can be used. When using a higher-order borane compound having high withstand voltage such as $Li_2B_{12}H_{12}$ as the main component of the solid electrolyte, in addition to the above-described sulfur-based positive electrode active material, a metal oxide having a transition metal which is an active material having a high equilibrium potential can also be used. When using a positive electrode active material having a high equilibrium potential, a battery voltage per cell can be increased.

As the negative electrode active material to be contained in the negative electrode layer, for example, a metal active material and a carbon-based active material can be used. Examples of the metal active material include $Li_4Ti_5O_{12}$, Li, In, Al, Si, SiO, Sn and alloys of these metals. Examples of the carbon-based active material include mesocarbon microbeads (MCMB), a highly oriented graphite (HOPG), a hard carbon and a soft carbon. In particular, it is preferred to use an active material having a lower equilibrium potential as the negative electrode because the energy density of the battery is improved to increase the operating voltage. Examples of such negative electrode active materials include Li, a carbon-based active material, Si and SiO.

The binder to be used for the positive electrode layer is not particularly limited, but for example, a polyimide-based material, an acrylic material, polysiloxane, polyalkylene glycol, polyvinylidene fluoride (PVdF), polytetrafluoroethylene (PTFE), ethylene-vinyl alcohol copolymer (EVOH), etc. can be used. According to need, a thickener such as carboxymethyl cellulose (CMC) can also be used.

The binder to be used for the negative electrode layer is not particularly limited, but for example, a polyimide-based material, polysiloxane, polyalkylene glycol, polyvinylidene fluoride (PVdF), polytetrafluoroethylene (PTFE), styrene-butadiene rubber (SBR), an acrylic material, etc. can be used. According to need, a thickener such as carboxymethyl cellulose (CMC) can also be used.

The conduction assisting agent to be used for the electrode layer is not particularly limited as long as it has desired conductivity. Examples thereof include a conduction assisting agent made of a carbon material. Specific examples thereof include carbon black, acetylene black, Ketjen black and carbon fiber.

As the method for preparing the electrode sheet, a publicly-known method can be used. For example, the positive electrode active material or negative electrode active material is mixed with the binder, the conduction assisting agent and an organic solvent to prepare a coating solution. The current collector is coated with the coating solution using the doctor blade method, spin coating method, spray coating method or the like, followed by drying, thereby preparing the electrode sheet, wherein the electrode layer is formed on the current collector.

<Lithium Doping>

In the case where none of the positive electrode layer and the negative electrode layer contains Li as the active material, for example, in the case where the sulfur-based positive electrode active material is used for the positive electrode layer and Si, SiO or the carbon-based active material is used for negative electrode layer, one of the active materials must be lithium-doped. Lithium doping is carried out, for example, by assembling an electrolyte-based battery as described in WO2015/152214. When producing an all-solid-state battery using an electrolyte-based electrode sheet as in the case of the present invention, lithium doping can be carried out according to an existing method. The interfaces between the positive electrode layer, the solid electrolyte layer and the negative electrode layer in the all-solid-state battery must be firmly bonded. It is extremely difficult to carry out lithium doping in the form of the all-solid-state battery and to disassemble the battery to take out each electrode sheet. Therefore, in the case where the all-solid-state battery is produced using a combination of active materials, wherein none of the active materials of the positive electrode layer and the negative electrode layer contains Li, a production method utilizing an electrode sheet usable in the electrolyte system is significantly advantageous.

As the method of lithium doping, a publicly-known method can be used. For example, lithium doping may be carried out according to an electrochemical method in which a metal lithium foil is used for a counter electrode to prepare a battery, or a chemical method in which a metal hydride such as metal lithium, alkyllithium, $LiAlH_4$ and $LiBH_4$ is directly brought into contact with the electrode sheet to perform a reaction. When lithium doping is carried out according to the chemical method, it can be applied to the electrode sheet or the active material. Among these techniques, an electrochemical technique is more excellent because the amount of lithium doping can be comprehended by measuring the amount of a current flowed or the electric potential of the lithium-doped electrode layer.

<Solid Electrolyte Solution>

Regarding the solid electrolyte solution to be used in the present invention, the type of the solid electrolyte is not particularly limited, but a sulfide and a boron hydride compound can be preferably used, and the boron hydride compound is more preferred because it is soft and soluble in various solvents.

The boron hydride compound can be used without particular limitation, but a Li-containing boron hydride compound is preferred, and examples thereof include $LiBH_4$, a $LiBH_4$—$LiI$-based material, $3LiBH_4$—$LiI$, a $LiBH_4$—$P_2S_5$-based material, $9LiBH_4$—$P_2S_5$, a $LiBH_4$—$P_2I_4$-based material, $9LiBH_4$—$P_2I_4$, $85LiBH_4$-$15P_2I_4$, $Li_2B_{12}H_{12}$, $Li_2B_{10}H_{10}$, $LiCB_{11}H_{12}$ and $LiCB_9H_{10}$. The $LiBH_4$—$LiI$-based material means a solid solution with a molar ratio of $LiBH_4/LiI$=0.8-5. The $LiBH_4$—$P_2S_5$-based material means a crystal synthesized with a feed molar ratio of $LiBH_4/P_2S_5$=5.6-49. The $LiBH_4$—$P_2I_4$-based material means a crystal synthesized with a feed molar ratio of $LiBH_4/P_2I_4$=4-99.

Examples of the sulfide include glass and glass ceramics prepared from $Li_2S$ and $P_2S_5$, an $\alpha$-, $\beta$- or $\gamma$-crystal represented by the composition of $Li_3PS_4$, an argyrodite-type crystal represented by the composition of $Li_6PS_5X$ (X is halogen), and an LGPS crystal represented by the composition of $Li_{10}GeP_2S_{12}$. Note that a solution of a precursor thereof may also be used, and it is also possible to use a composition by which a sulfide solid electrolyte can be produced after drying after coating/burning.

The solvent is not particularly limited as long as the solid electrolyte can be dissolved therein, but it is preferably a material that does not react with the solid electrolyte. For UK-la-based materials, an ether-based solvent such as tetrahydrofuran, 2-methyltetrahydrofuran, 1,2-dimethoxyethane and diethylene glycol dimethyl ether; a nitrile-based solvent such as propanenitrile and acetonitrile; and an amide-based solvent such as N,N-dimethylformamide and N,N-dimethylacetamide are more preferred, and these materials may be used solely or in combination. Even more preferred are tetrahydrofuran, 2-methyltetrahydrofuran, 1,2-dimethoxyethane, diethylene glycol dimethyl ether and acetonitrile, and particularly preferred are tetrahydrofuran and acetonitrile.

For higher-order boron hydride compounds such as $Li_2B_{12}H_{12}$, it is possible to use various materials including: $H_2O$; an alcohol-based solvent such as methanol, ethanol, propanol and butanol; an ether-based solvent such as tetrahydrofuran, 2-methyltetrahydrofuran, 1,2-dimethoxyethane and diethylene glycol dimethyl ether; acetonitrile; an acid ester-based solvent such as ethyl acetate and methyl acetate; an amide-based solvent such as N,N-dimethylformamide and N,N-dimethylacetamide; and a ketone-based solvent, and these materials may be used solely or in combination. Among them, $H_2O$, an alcohol-based solvent and acetonitrile are preferred in consideration of the solubility, viscosity, evaporation rate, safety of solvent and suppressing side reactions.

As the solvent for the sulfide, an ether-based solvent such as tetrahydrofuran, 2-methyltetrahydrofuran, 1,2-dimethoxyethane, cyclopentyl methyl ether, diisopropyl ether, diethyl ether, dimethyl ether, dioxane and diethylene glycol dimethyl ether; a nitrile-based solvent such as propanenitrile and acetonitrile; an amide-based solvent such as N,N-dimethylformamide, N,N-dimethylacetamide and N-monomethylformamide; and an ester-based solvent such as methyl acetate, ethyl acetate and butyl acetate are more preferred, and these materials may be used solely or in combination. Even more preferred are tetrahydrofuran, 2-methyltetrahydrofuran, 1,2-dimethoxyethane, diethylene glycol dimethyl ether, acetonitrile and N-monomethylformamide, and particularly preferred are tetrahydrofuran, acetonitrile and N-monomethylformamide. Note that when the sulfide is dissolved, an alcohol solvent such as methanol and ethanol may be added, but in this case, the alcohol solvent reacts with the sulfide, resulting in a solid electrolyte in which a part of S is substituted with O.

When the sulfide or $LiBH_4$ is contained, since dissolution is easily performed by $H_2O$, it is preferred to sufficiently remove the moisture in the solvent. The moisture concentration is preferably 50 ppm or less, and more preferably 15 ppm or less. Meanwhile, since the higher-order boron hydride compound is stable even in $H_2O$ at room temperature, it can be used even when the moisture content in the solvent is relatively high.

The concentration of the solid electrolyte in the solid electrolyte solution is generally adjusted to 1-40 wt % so that the optimum viscosity can be obtained at the time of impregnation later, though the optimum value varies depending on the types of the solid electrolyte and the solvent. When the concentration is lower than this range, the efficiency of deposition of the solid electrolyte is deteriorated. When the concentration is higher, the viscosity increases, and due to this, impregnation to the bottoms of pores may become more difficult. The concentration of the solid electrolyte in the solid electrolyte solution is preferably 3-25 wt %.

<Insoluble Fine Particles>

As the insoluble fine particles to be dispersed in the solid electrolyte solution, either an organic substance or an inorganic substance can be used, but the inorganic substance is more preferred because it is not easily dissolved in the solvent. As the effects obtained by the addition of the insoluble fine particles, there are various functions considered including the improvement of wettability of the coating solution on the electrode surface, the securement of the route of volatile solvent gas at the time of drying and the prevention of flowability of the coating solution.

Examples of the organic substance include an acrylic substance, a styrene-based substance, a melamine-based substance, a urethane-based substance, a phenol-based substance and a polyolefin-based substance. Examples of the inorganic substance include silica ($SiO_2$), alumina ($Al_2O_3$), titania ($TiO_2$), zirconia ($ZrO_2$), magnesia (MgO) and calcia (CaO). These substances may be used solely, or two or more of them may be used in combination.

The median diameter d50 of the insoluble fine particles is preferably 10 nm to 1 μm, more preferably 20 nm to 800 nm, and particularly preferably 30 nm to 600 nm. The smaller the average particle diameter is, the more the precipitation of the added insoluble fine particles is reduced, and as a result, the dispersibility thereof is improved. Note that the median diameter d50 of the insoluble fine particles can be measured by a laser diffraction/scattering type particle size distribution measuring device.

<Coating Solution>

The addition amount of the insoluble fine particles in the coating solution is preferably 0.1 wt % to 30 wt %, more preferably 0.5 wt % to 20 wt %, and particularly preferably 1 to 10 wt %. When the concentration of the insoluble fine particles is 0.1 wt % to 30 wt %, it is preferred because unevenness after coating is reduced and satisfactory coating properties are obtained.

Regarding the method for dispersing the insoluble fine particles, it is sufficient even when only stirring is performed. However, when the insoluble fine particles to be added are aggregated, for the purpose of disaggregation thereof, it is also possible to use ultrasonic waves, a homogenizer, a rotating/revolving mixer, a ball mill or the like.

Note that the coating solution may contain various additives in addition to the solid electrolyte solution and the insoluble fine particles for the purpose of viscosity adjustment and volatilization control.

<Impregnation with Coating Solution>

As the method for impregnating the electrode sheet with the coating solution, a publicly-known method for impregnating an electrode sheet with an electrolyte can be used. In particular, for impregnation to the bottoms of pores of the electrode layer, vacuum impregnation is preferred. Further, when heating, the viscosity of the solution is decreased, and therefore impregnation to the bottoms of pores can be carried out more efficiently. Note that the insoluble fine particles added to the coating solution are required for uniformly forming the solid electrolyte layer on the surface of the electrode layer, and are not required to reach the insides of pores of the electrode layer.

<Deposition of Solid Electrolyte to Voids of Electrode Layer>

After the electrode layer is impregnated with the coating solution, the solvent is removed to cause the solid electrolyte to deposit, and voids of the electrode layer are densely filled with the solid electrolyte. In the case of impregnation with the solid electrolyte molten salt obtained by melting the solid electrolyte having a low melting point, the temperature is decreased to the melting point or lower to cause the solid electrolyte to deposit. In the case of using the solid electrolyte solution obtained by dissolving the solid electrolyte in the solvent, the solvent is volatilized to cause the solid electrolyte to deposit. It is preferred to perform heating in order to promote volatilization of the solvent. The temperature for heating varies depending on the type of the solvent, but it may be 50-200° C. When the solvent is volatilized at a temperature higher than this range, there is concern that the solid electrolyte may not deposit densely due to occurring of a side reaction or foaming of the solvent. Further, by heating under an inert gas stream or under vacuum, volatilization of the solvent can be promoted. Note that the process from <Impregnation with coating solution> described above to this drying is preferably repeated a plurality of times because the bulk density of the solid electrolyte can be increased thereby. The process is more preferably repeated 3 to 10 times.

The electrode sheet filled with the solid electrolyte after drying is subjected to rolling, thereby more densifying the electrode layer. The method of rolling is not particularly limited, but it is preferred to use the roll pressing method which is used for preparing electrode sheets of lithium ion batteries. The roll pressing method has high continuous productivity, but the pressing pressure in this case is lower than those of the uniaxial pressing method and isostatic pressing method. The pressing pressure in this case is preferably 0.1-100 MPa, and more preferably 1-80 MPa. For forming conventional all-solid-state batteries, very high pressing pressures are required in order to deform and densify powder itself, but in the present invention, since the solid electrolyte is formed densely in the voids of the electrode layer by causing the solid electrolyte to deposit from the solid electrolyte solution, it is not required to apply a high pressing pressure such as 300 MPa that deforms particles. In the present invention, the purpose of rolling after drying is to fill small cracks generated by expansion/shrinkage due to thermal change and small voids generated at the time of volatilization of the solvent, and sufficient effects can be obtained by the roll pressing method.

Unlike Patent Document 1 (Japanese Laid-Open Patent Publication No. 2015-2080), the present invention has the advantage that the positive electrode layer and negative electrode layer whose pores are filled with the solid electrolyte can be formed without pressing.

<Formation of Solid Electrolyte Layer>

The surface of the electrode layer whose pores are filled with the solid electrolyte is coated with the coating solution, and then the solvent is removed to cause the solid electrolyte to deposit, thereby forming the solid electrolyte layer. Coating can be carried out according to a publicly-known method, and examples thereof include the doctor blade method, the spin coating method and the spray coating method. Drying can be carried out according to a method similar to that described in <Deposition of solid electrolyte to voids of electrode layer>. By coating the surface of the electrode layer with the solid electrolyte solution or solid electrolyte molten salt at the time of <Impregnation with coating solution>, <Deposition of solid electrolyte to voids of electrode layer> and <Formation of solid electrolyte layer> can be carried out simultaneously.

When the solid electrolyte layer formed on the positive electrode sheet is too thin, a short circuit may be caused, and when the layer is too thick, the resistance is increased. From this viewpoint, the thickness of the solid electrolyte layer is preferably 1-300 μm, and more preferably 5-100 μm.

When the solid electrolyte layer formed on the negative electrode sheet is too thin, a short circuit may be caused, and when the layer is too thick, the resistance is increased. From this viewpoint, the thickness of the solid electrolyte layer is preferably 1-300 μm, and more preferably 5-100 μm.

Further, the solid electrolyte can be formed independently. In this case, a support into which solutions can permeate is impregnated with the solid electrolyte solution, and the solvent is removed to cause the solid electrolyte to deposit. Since the solid electrolyte layer plays a role as a separator between the positive electrode layer and the negative electrode layer, the support is required to have high insulation properties, and though there is no particular limitation, it is possible to use a separator to be used for electrolytes. Examples thereof include a glass fiber filter, a polyolefin-based separator, a cellulose-based separator and a non-woven fabric-based separator. Among them, preferred are a glass fiber filter and non-woven fabric, which have a high ratio of voids in the separator and high heat resistance. This is because, since the solid electrolyte is formed in void portions, the ratio of the solid electrolyte serving as the ion conductor is increased. Further, in the case of a polyolefin-based separator having the shutdown function, by heating at the time of <Deposition of solid electrolyte to voids of electrode layer>, the shutdown function is actuated, and the number of voids in which the solid electrolyte deposits may be more decreased. As the impregnation method and the method for deposition of the solid electrolyte, methods similar to those respectively described in <Impregnation with coating solution> and <Deposition of solid electrolyte to voids of electrode layer> can be conducted. In such a manner, a solid electrolyte layer sheet can be prepared independently. The thickness of the solid electrolyte layer sheet is preferably 1-300 μm, and more preferably 5-100 μm.

After the solid electrolyte is deposited by drying, the solid electrolyte layer is densified by rolling. The rolling method is not particularly limited, but it is preferred to employ the roll pressing method which has excellent productivity. Since the solid electrolyte layer obtained by causing the solid electrolyte to deposit from the solid electrolyte solution is relatively dense and the boron hydride compound is soft, the solid electrolyte layer can be sufficiently densified by rolling with a low pressing pressure. The pressing pressure in this case is preferably 0.1-100 MPa, and more preferably 1-80

MPa. Note that voids generated in the solid electrolyte layer can be suppressed by overcoating with the solid electrolyte solution in a manner similar to that in <Formation of solid electrolyte layer> after pressing. This overcoating may be carried out a plurality of times, but it is usually sufficient when it is carried out once.

<Preparation of all-Solid-State Battery>

The all-solid-state battery can be prepared by layering respective sheets, followed by rolling.

In the present invention, it is preferred to include a step of bonding the positive electrode layer to the negative electrode layer in a manner such that the solid electrolyte layer is positioned between the positive electrode layer and the negative electrode layer. The pressing pressure for bonding the positive electrode layer to the negative electrode layer is preferably 0.0001-100 MPa, more preferably 0.0005-20 MPa, and particularly preferably 0.001-10 MPa.

As the combination of respective sheets, any of the following combinations can be employed: (1) a sheet obtained by forming the solid electrolyte layer on the positive electrode sheet+the negative electrode sheet; (2) a sheet obtained by forming the solid electrolyte layer on the negative electrode sheet+the positive electrode sheet; (3) a sheet obtained by forming the solid electrolyte layer on the positive electrode sheet+a sheet obtained by forming the solid electrolyte layer on the negative electrode sheet; and (4) the positive electrode sheet+the solid electrolyte layer sheet+the negative electrode sheet. The boron hydride compound has an ability as a binder, and therefore has a high effect of bonding these sheets. As the rolling method, for example, the roll pressing method can be employed.

EXAMPLES

Hereinafter, the embodiments of the present invention will be more specifically described by way of examples, but the embodiments are not limited to the examples.

<Method for Producing Sulfur-Based Positive Electrode Active Material>

With 100 parts by weight of a high cis butadiene rubber (UBEPOL (registered trademark) BR150L manufactured by Ube Industries, Ltd., cis-1,4 bond content: 98%), 1000 parts by weight of sulfur (colloidal sulfur manufactured by Tsurumi Chemical Industry Co., Ltd.), 25 parts by weight of a vulcanization accelerator (zinc diethyldithiocarbamate: NOCCELER (registered trademark) EZ manufactured by Ouchi Shinko Chemical Industrial Co., Ltd.) and 20 parts by weight of acetylene black (DENKA BLACK manufactured by Denki Kagaku Kogyo K.K.) were blended, and the mixture was kneaded using a kneading test apparatus. This was heated to 450° C. under argon atmosphere at a temperature raising rate of 5° C./min, and after that, it was kept at 450° C. for 2 hours and then naturally cooled. During this, sulfur was set to be under a refluxed condition, and a slight amount of argon was flowed in order to remove a gas generated. After that, it was kept at 250° C. for 3 hours under vacuum conditions and the remaining sulfur was removed, thereby obtaining powder. Next, the powder was crushed using a planetary ball mill to obtain a sulfur-based positive electrode active material with d50=1.5 μm (result of measurement in water using Partica LA-960 manufactured by HORIBA).

<Method for Producing Positive Electrode Slurry>

Weighing was carried out so that the weight ratio of the above-described sulfur-based positive electrode active material obtained:acetylene black:acrylic binder became 90:5:5, water was added to the mixture in a manner such that the solid content of slurry became 40 wt %, and it was kneaded by a kneading machine (ARE-310 manufactured by Thinky Corporation), thereby obtaining a positive electrode slurry.

<Method for Producing Negative Electrode Slurry>

Weighing was carried out so that the weight ratio of $SiO_2$:acetylene black:carbon nanofiber (VGCF (registered trademark) manufactured by Showa Denko K.K.):polyimide binder became 77:4:1:18, N-methylpyrrolidone was added to the mixture in a manner such that the solid content of slurry became 60 wt %, and it was kneaded by a kneading machine, thereby obtaining a negative electrode slurry.

<Preparation of Positive Electrode Sheet>

A current collector (carbon-coated aluminum foil having a thickness of 15 μm) was coated with the above-described positive electrode slurry obtained using a desk-top coating machine (manufactured by Tester Sangyo Co., Ltd., FILM COATER: PI1210), and it was preliminarily dried at 80° C. for 10 minutes using a hot-air dryer. The electrode sheet after preliminarily dried was put into a glass tube to perform evacuation, and using a glass tube oven (B-555 manufactured by BUCHI), it was vacuum dried at 150° C. for 10 hours. The capacity density of the obtained positive electrode sheet was 0.5 mAh/cm$^2$.

<Preparation of Negative Electrode Sheet>

A current collector (SUS foil having a thickness of 10 μm) was coated with the above-described negative electrode slurry obtained using a desk-top coating machine (manufactured by Tester Sangyo Co., Ltd., FILM COATER: PI1210), and it was preliminarily dried at 80° C. for 10 minutes using a hot-air dryer. The electrode sheet after preliminarily dried was put into a glass tube to perform evacuation, and using a glass tube oven (B-555 manufactured by BUCHI), it was vacuum dried at 300° C. for 10 hours.

Using the prepared electrode sheet as a test electrode, a metal lithium foil as a counter electrode, a glass fiber filter (manufactured by Advantech Co., Ltd., GA-100, thickness: 500 μm) as a separator and 1M $LiPF_6$ ethylene carbonate/diethyl carbonate (=1/1, vol/vol) as an electrolyte, these were enclosed in an aluminum laminate to prepare a battery cell. Note that all the operations were carried out in a dry room (room temperature: 20° C., room dew point: −65° C.).

Next, the electrode sheet was lithium-doped using a charge/discharge test apparatus. Discharge (Li insertion) was performed at 30° C. with a current of 0.3 mA until the voltage became 0.001 V, and after a 10-minute pause, charge (Li removal) was performed with a current of 0.3 mA until the voltage became 1.0 V. After that, discharge (Li insertion) was performed again with a current of 0.3 mA until the voltage became 0.001 V, and thus the electrode sheet was lithium-doped. The lithium-doped aluminum laminate cell was disassembled to take out the electrode sheet, and the surface of the electrode sheet was washed with dimethyl carbonate and then naturally dried, thereby preparing a negative electrode sheet. The capacity density of the obtained negative electrode sheet was 1.5 mAh/cm$^2$.

Experiment Example 1

<Preparation of Coating Solution>

25 parts by mass of $3LiBH_4$—LiI as a solid electrolyte was added to and mixed with 75 parts by mass of tetrahydrofuran as a solvent to prepare a $3LiBH_4$—LiI/tetrahydrofuran solution.

Subsequently, nano-$SiO_2$ (median diameter d50=270 nm) was added to the $3LiBH_4$—LiI/tetrahydrofuran solution in a manner such that the weight ratio of ($3LiBH_4$—LiI/tetrahydrofuran solution):nano-SiO$_2$ became 99:1, and a container was lightly shaken by hand to disperse nano-SiO$_2$, thereby obtaining a coating solution.

<Formation of Solid Electrolyte Layer>

Figure 2:
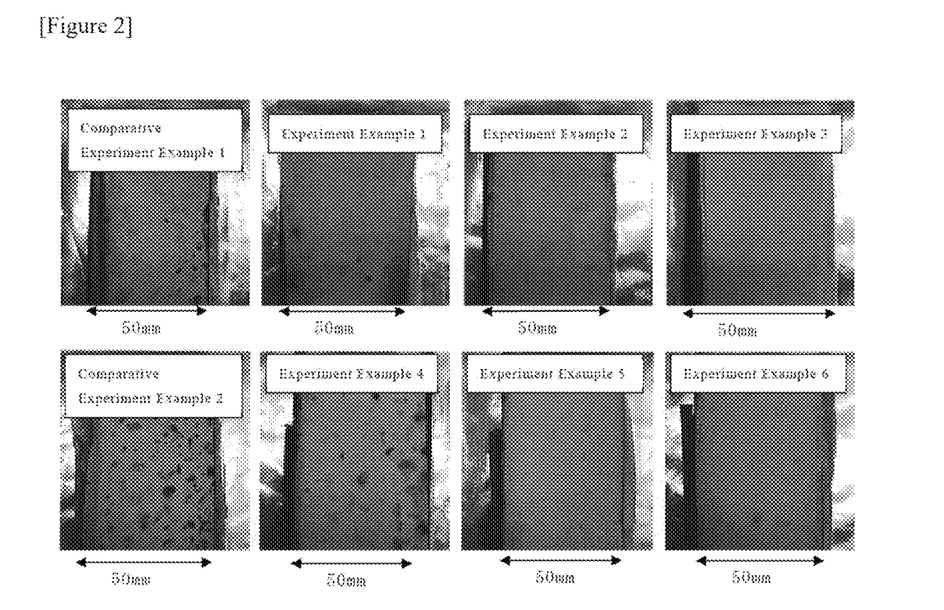
FIG. 2 shows photographs of the electrode sheets having a solid electrolyte layer formed in Experiment Examples 1-6 and Comparative Experiment Examples 1-2.

The surface of the electrode layer of the above-described positive electrode sheet obtained was coated with the obtained coating solution by wire coating (clearance: 15 μm), and it was preliminarily dried on a hot plate at 50° C. for 1 hour. This operation of from coating to preliminary drying was repeated 8 times. Note that all of these were carried out in a dry room (room temperature: 20° C., room dew point: −65° C.). After that, it was put into a vacuum drying oven (VOS-201SD manufactured by Rikagaku Kikai) and vacuum dried at 120° C. for 15 hours. A positive electrode sheet, wherein a solid electrolyte layer was formed in the inside and on the surface of the electrode layer, was obtained. FIG. 2 shows a photograph of the electrode sheet with the solid electrolyte layer formed.

Experiment Examples 2-6

The operation was carried out in a manner similar to that in Experiment Example 1, except that the ratio of nano-SiO$_2$ to be added and the electrode sheet to be used were changed as described in Table 1, and a positive electrode sheet or negative electrode sheet, wherein a solid electrolyte layer was formed on the surface, was prepared. FIG. 2 shows photographs of the electrode sheets with the solid electrolyte layer formed. It is understood that the solid electrolyte layer (white portion) was significantly uniformly formed when compared to the case where nano-SiO$_2$ was not added.

TABLE 1

Ratio of addition amount of nano-SiO$_2$ in Experiment Examples (mass ratio)

| | Experiment Examples | | | | | |
|---|---|---|---|---|---|---|
| | Experiment Example 1 | Experiment Example 2 | Experiment Example 3 | Experiment Example 4 | Experiment Example 5 | Experiment Example 6 |
| Electrode sheet | Positive electrode | Positive electrode | Positive electrode | Negative electrode | Negative electrode | Negative electrode |
| Solution: SiO$_2$ | 99:1 | 97:3 | 95:5 | 99:1 | 97:3 | 95:5 |

Comparative Experiment Examples 1-2

By using a technique similar to that in Experiment Example 1, except that nano-SiO$_2$ was not added, a positive electrode sheet with a solid electrolyte layer formed was prepared in Comparative Experiment Example 1, and a negative electrode sheet with a solid electrolyte layer formed was prepared in Comparative Experiment Example 2. FIG. 2 shows photographs of the electrode sheets with the solid electrolyte layer formed.

Example 1

Figure 3:
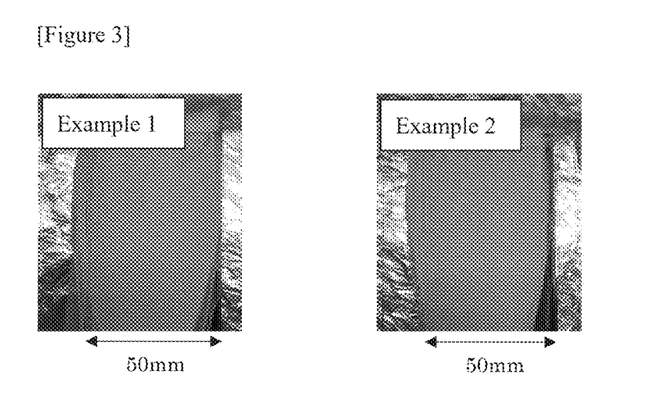
FIG. 3 shows photographs of the overcoated electrode sheets prepared in Examples 1 and 2.

A positive electrode sheet and a negative electrode sheet were prepared in a manner similar to that in Experiment Example 1, except that the addition amount of SiO$_2$ was 5 wt % and that the clearance of wire coating in <Formation of solid electrolyte layer> was changed to 35 μm. These sheets were overcoated with a coating solution (3LiBH$_4$—LiI/tetrahydrofuran solution in which the addition amount of SiO$_2$ was 5 wt %) and vacuum dried (120° C., 10 hours) to prepare an overcoated positive electrode sheet and an overcoated negative electrode sheet. FIG. 3 shows a photograph of the prepared overcoated electrode sheet.

The overcoated positive electrode sheet and the overcoated negative electrode sheet obtained above were used in combination to prepare a CR2032 type coin cell. Specifically, the overcoated positive electrode sheet and the overcoated negative electrode sheet were layered in a manner such that the electrode layer surfaces thereof were opposed to each other, and cold pressing was carried out under 26 MPa using a uniaxial pressing machine. The obtained sheet was put into the CR2032 type coin cell, thereby preparing an all-solid-state battery.

The capacity density of each electrode sheet and the weight and thickness of the formed active material layer and solid electrolyte layer of each electrode sheet are described in Table 2. Note that the weight of the solid electrolyte layer means the total weight of the solid electrolyte formed in the inside and on the surface of the electrode sheet, and the thickness means the thickness of the solid electrolyte layer formed on the surface of the electrode sheet.

TABLE 2

Weight and thickness of formed layers of each electrode sheet

| | | Active material layer | | Solid electrolyte layer | |
|---|---|---|---|---|---|
| | Capacity density (mAhr/cm$^2$) | Weight (mg/cm$^2$) | Thickness (μm) | Total weight (mg/cm$^2$) | Thickness (μm) |
| Positive electrode | 0.49 | 1.08 | 15 | 7.9 | 84 |
| Negative electrode | 1.0 | 0.87 | 20 | 8.0 | 82 |

Example 2

An overcoated positive electrode sheet and an overcoated negative electrode sheet were prepared in a manner similar to that in Example 1, except that the addition amount of SiO$_2$ was 10 wt %. FIG. 3 shows a photograph of the prepared overcoated electrode sheet. Subsequently, an all-solid-state battery was prepared in a manner similar to that in Example 1.

The capacity density of each electrode sheet and the weight and thickness of the formed active material layer and solid electrolyte layer of each electrode sheet are described in Table 3. Note that the weight of the solid electrolyte layer means the total weight of the solid electrolyte formed in the inside and on the surface of the electrode sheet, and the thickness means the thickness of the solid electrolyte layer formed on the surface of the electrode sheet.

TABLE 3

Weight and thickness of formed layers of each electrode sheet

| | Active material layer | | | Solid electrolyte layer | |
|---|---|---|---|---|---|
| | Capacity density (mAhr/cm$^2$) | Weight (mg/cm$^2$) | Thickness (μm) | Total weight (mg/cm$^2$) | Thickness (μm) |
| Positive electrode | 0.49 | 1.08 | 15 | 9.3 | 102 |
| Negative electrode | 1.0 | 0.87 | 19 | 7.1 | 75 |

<Charge and Discharge Test>

Figure 4:
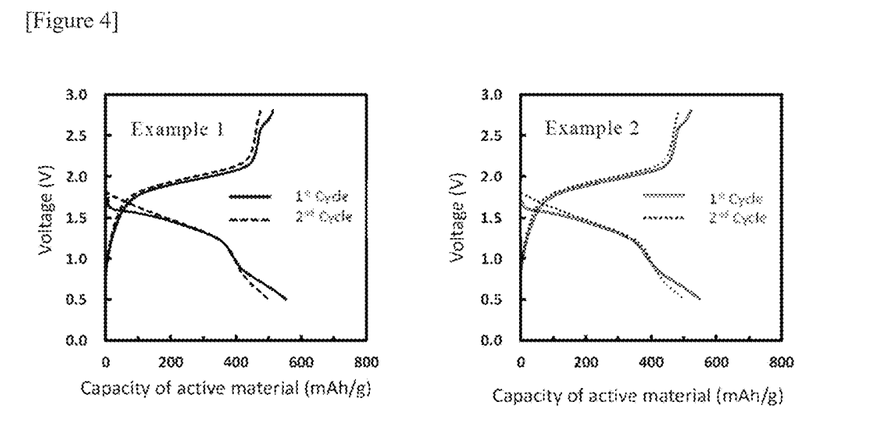
FIG. 4 shows graphs showing charging and discharging curves of the all-solid-state batteries prepared in Examples 1 and 2.
Figure 5:
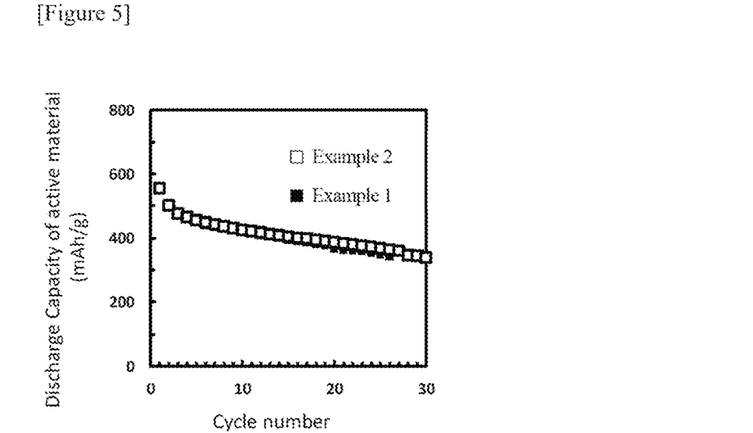
FIG. 5 is a graph showing cycle characteristics of the all-solid-state batteries prepared in Examples 1 and 2.

Using the all-solid-state batteries obtained in Example 1 and Example 2, a constant current charge and discharge test was conducted with an environmental temperature of 60° C., a charge/discharge current of 0.1 C-rate (for positive electrode) and an operating voltage range of 0.5-2.8 V. Charging and discharging curves of the all-solid-state batteries prepared in Examples 1 and 2 are shown in FIG. 4, and cycle characteristics of the all-solid-state batteries prepared in Examples 1 and 2 are shown in FIG. 5. It is understood that the prepared all-solid-state batteries can perform charge/discharge stably. The unit of the capacity "mAh/g" indicates the charge capacity or discharge capacity per weight of the active material.

<Analysis of Nano-SiO$_2$>

Figure 6:
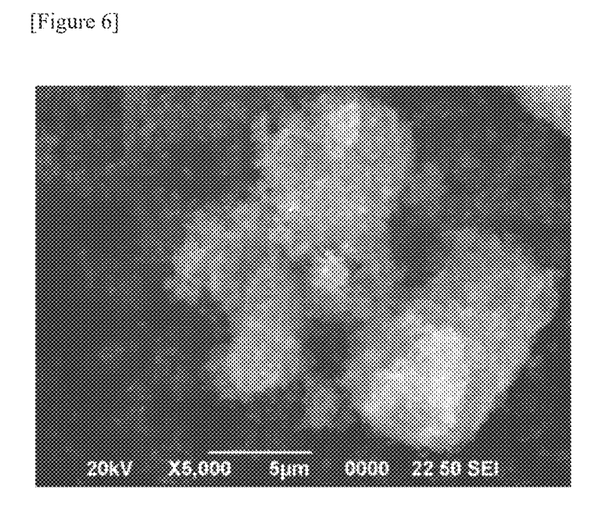
FIG. 6 is an SEM image of nano-$SiO_2$ used in Example 1.
Figure 7:
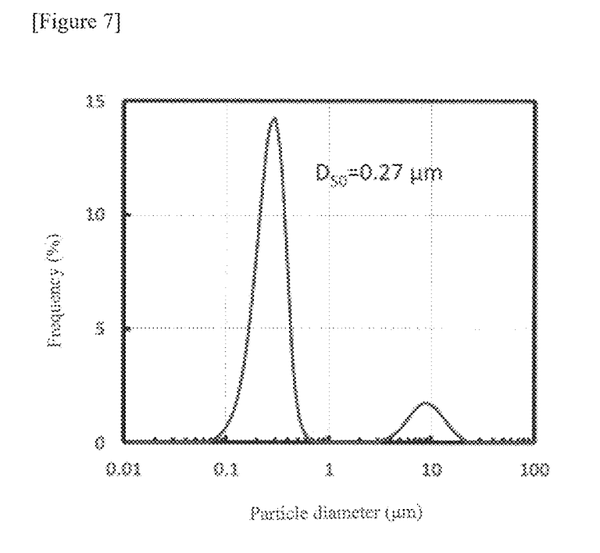
FIG. 7 is a graph showing the particle size distribution (on the volume basis) of nano-$SiO_2$ used in Example 1.

FIG. 6 shows an SEM image of nano-SiO$_2$ used in Example 1, and FIG. 7 shows the particle size distribution (on the volume basis) of nano-SiO$_2$ used in Example 1. Note that the particle size distribution was measured by using Partica LA-960 manufactured by HORIBA, wherein: water was used as a dispersion medium; a small amount of TritonX as a dispersant was added; and the measurement was carried out while performing ultrasonic irradiation (30 W). It is understood from the SEM image of FIG. 6 that primary particles forming an aggregate are at the nano level (less than 1 μm). It is understood from the particle size distribution of FIG. 7 that nanoparticles with d50=270 nm are the main.

EXPLANATIONS OF LETTERS OR NUMERALS 10 electrode sheet (positive electrode sheet)
11 current collector
12 positive electrode layer
13 solid electrolyte layer
20 electrode sheet (negative electrode sheet)
21 current collector
22 negative electrode layer
23 solid electrolyte layer

The invention claimed is:

1. A method for producing an all-solid-state battery having a solid electrolyte layer between a positive electrode layer and a negative electrode layer, the method comprising:
preparing a solid electrolyte solution by dissolving a solid electrolyte in an organic solvent, and obtaining a coating solution by suspending fine particles which are insoluble in the solid electrolyte solution;
coating at least one of the positive electrode layer and the negative electrode layer with the coating solution; and
removing the solvent from the coated coating solution to deposit the solid electrolyte on at least one of the positive electrode layer and the negative electrode layer,
wherein the solid electrolyte consists of at least one selected from the group consisting of LiBH$_4$, an LiBH$_4$-LiI-based material, 3LiBH$_4$-LiI, an LiBH$_4$-P$_2$S$_5$-based material, 9LiBH$_4$-P$_2$S$_5$, an LiBH$_4$-P$_2$I$_4$-based material, 9LiBH$_4$-P$_2$I$_4$, 85LiBH$_4$-15P$_2$I$_4$, Li$_2$B$_{12}$H$_{12}$, Li$_2$B$_{10}$H$_{10}$, LiCB$_{11}$H$_{12}$ and LiCB$_9$H$_{10}$.

2. The method according to claim 1, wherein the fine particles comprise at least one selected from the group consisting of silica (SiO$_2$), alumina (Al$_2$O$_3$), titania (TiO$_2$), zirconia (ZrO$_2$), magnesia (MgO) and calcia (CaO).

3. The method according to claim 1, wherein the coating solution comprises the fine particles in an amount of 0.1 to 30% by mass.

4. The method according to claim 1, wherein the fine particles have an average particle diameter (median diameter d50) of 10 nm to 1 μm.

5. The method according to claim 1, wherein the solvent comprises at least one selected from the group consisting of H$_2$O, an alcohol-based solvent, an ether-based solvent and a nitrile-based solvent.

6. The method according to claim 1, wherein a series of operations of the step of coating and the step of depositing is repeated a plurality of times.

\* \* \* \* \*